US006584106B1

(12) United States Patent
Merchant et al.

(10) Patent No.: US 6,584,106 B1
(45) Date of Patent: Jun. 24, 2003

(54) BACKBONE FORWARDING SCHEME FOR MULTIPORT NETWORK SWITCH

(75) Inventors: Shashank Merchant, Sunnyvale, CA (US); Robert Williams, Cupertino, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/317,146

(22) Filed: May 24, 1999

(51) Int. Cl.[7] .............................................. H04J 12/28
(52) U.S. Cl. .............................. 370/395.32; 370/395.31
(58) Field of Search ................................. 370/401, 402, 370/403, 422, 409, 395.53, 395.52, 395.31, 395.32

(56) References Cited

U.S. PATENT DOCUMENTS

| | | | |
|---|---|---|---|
| 5,515,376 A | 5/1996 | Murthy et al. | 370/85.13 |
| 5,949,783 A * | 9/1999 | Husak et al. | 370/396 |
| 5,968,126 A * | 10/1999 | Ekstrom et al. | 370/409 |
| 6,041,058 A * | 3/2000 | Flanders et al. | 370/401 |
| 6,085,238 A * | 7/2000 | Yuasa et al. | 370/409 |
| 6,181,699 B1 * | 1/2001 | Crinion et al. | 370/389 |

* cited by examiner

Primary Examiner—Wellington Chin
Assistant Examiner—William Schultz

(57) ABSTRACT

A novel method of data forwarding is provided in a network switch having multiple ports including at least one backbone port for data communications with backbone network nodes. Destination information of a received data packet is compared with a predetermined set of address data in an address table. If the packet's destination information is not found in the address table, the received data packet is forwarded to the backbone port. Further, the source address information of the received data packet may be compared with the address table. In a regular mode of operation, if the packet's source address information is not found in the address table, this information is added to the address table. However, in a backbone mode of operation, the address information of a data packet received from the backbone port is prevented from being added to the address table. The switch may have backbone ports provided for multiple VLANs supported by the switch. A first data packet received from a first VLAN is forwarded to at least one backbone port for that VLAN, if the packet's destination information is not found in the address table. Similarly, a second data packet received from a second VLAN is forwarded to at least one backbone port for the second VLAN if the packet's destination information is not found in the address table. A backbone vector storage is provided for identifying backbone ports for the multiple VLANs supported by the switch.

9 Claims, 8 Drawing Sheets

BACKBONE FORWARDING SCHEME FOR MULTIPORT NETWORK SWITCH

FIELD OF THE INVENTION

This invention relates to data communication systems, and more particularly, to a system for forwarding frames received from backbone nodes in a multiport network switch.

BACKGROUND ART

A multiport switch may be provided in a data communication network to enable data communication between multiple network stations (desktop nodes) connected to various ports of the switch. Moreover, at least one port of the switch, for example, a gigabit port, may have a backbone connection for supporting data communication with backbone network nodes that are not directly connected to that switch. For example, such backbone nodes may be linked to the switch through a higher-level network switch or router.

For example, a virtual LAN (VLAN) may combine desktop and backbone nodes by department, type of user, or primary application. Workstations in a VLAN behave as if they are connected to the same wire even though they may actually be physically located on different segments of a LAN.

A logical connection may be created between receive and transmit ports of the switch to forward received frames to appropriate destinations. Based on frame header information, a decision making engine selectively controls forwarding received frames to a destination station. To make the frame forwarding decision, the decision making engine searches a look-up address table that stores address information of network nodes learned from receive frames. The network switch may be provided with an address table static random access memory (SRAM) for storing the address table.

To reduce the size of the address table SRAM it would be desirable to limit the amount of address information stored in the address table. As a large number of backbone nodes may be linked to the network switch through the switch's backbone connections, it would be desirable to avoid storing address information of the backbone nodes. Therefore, there is a need for a backbone forwarding scheme for forwarding frames received from the backbone nodes, without learning and storing their address information.

DISCLOSURE OF THE INVENTION

The invention provides a novel method of data forwarding in a network switch having multiple ports including at least one backbone port for providing data communications with backbone network nodes. The method comprises comparing destination information of a received data packet with a predetermined set of address data, and forwarding the received data packet to the at least one backbone port if the packet's destination information is not found in the predetermined set of address data. For example, the predetermined set of address data may be arranged in an address table.

Further, the source address information of the received data packet may be compared with the predetermined set of address data. In a regular mode of operation, address information of the received data packet is added to the address table if the packet's source address information is not found. However, in a backbone mode of operation, the address information of a data packet received from a backbone port is prevented from being added to the address table.

The data forwarding method of the present invention may be implemented for backbone ports supporting multiple VLANs. For example, if the destination information of a first data packet received from a first VLAN is not found in the address table, the first data packet is forwarded to at least one backbone port arranged for that VLAN. Similarly, a second data packet received from a second VLAN is forwarded to at least one backbone port provided for the second VLAN if the packet's destination information is not found in the address table.

In accordance with the present invention, the network switch comprises a decision making engine responsive to a received data packet to control its forwarding to a transmit port. The decision making engine includes a destination address logic circuit for comparing destination information of the received data packet with the predetermined set of address data. The decision making engine is configured for forwarding the received data packet to at least one backbone port if the destination information of the received data packet is not found in the address table. Preferably, the decision making engine comprises a backbone vector storage for identifying backbone ports for multiple VLANs supported by the network switch.

The decision making engine may further comprise a source address logic circuit for comparing source address information of the received data packet with the predetermined set of address data. The source address logic circuit may be operable in a regular mode to add address information of the received data packet to the address table if the packet's source address information is not found in the table. In a backbone mode of operation, the source address logic circuit prevents the address information of a data packet received from a backbone port from being added to the address table.

Various objects and features of the present invention will become more readily apparent to those skilled in the art from the following description of a specific embodiment thereof, especially when taken in conjunction with the accompanying drawings.

BEST MODE FOR CARRYING OUT THE INVENTION

Figure 1:
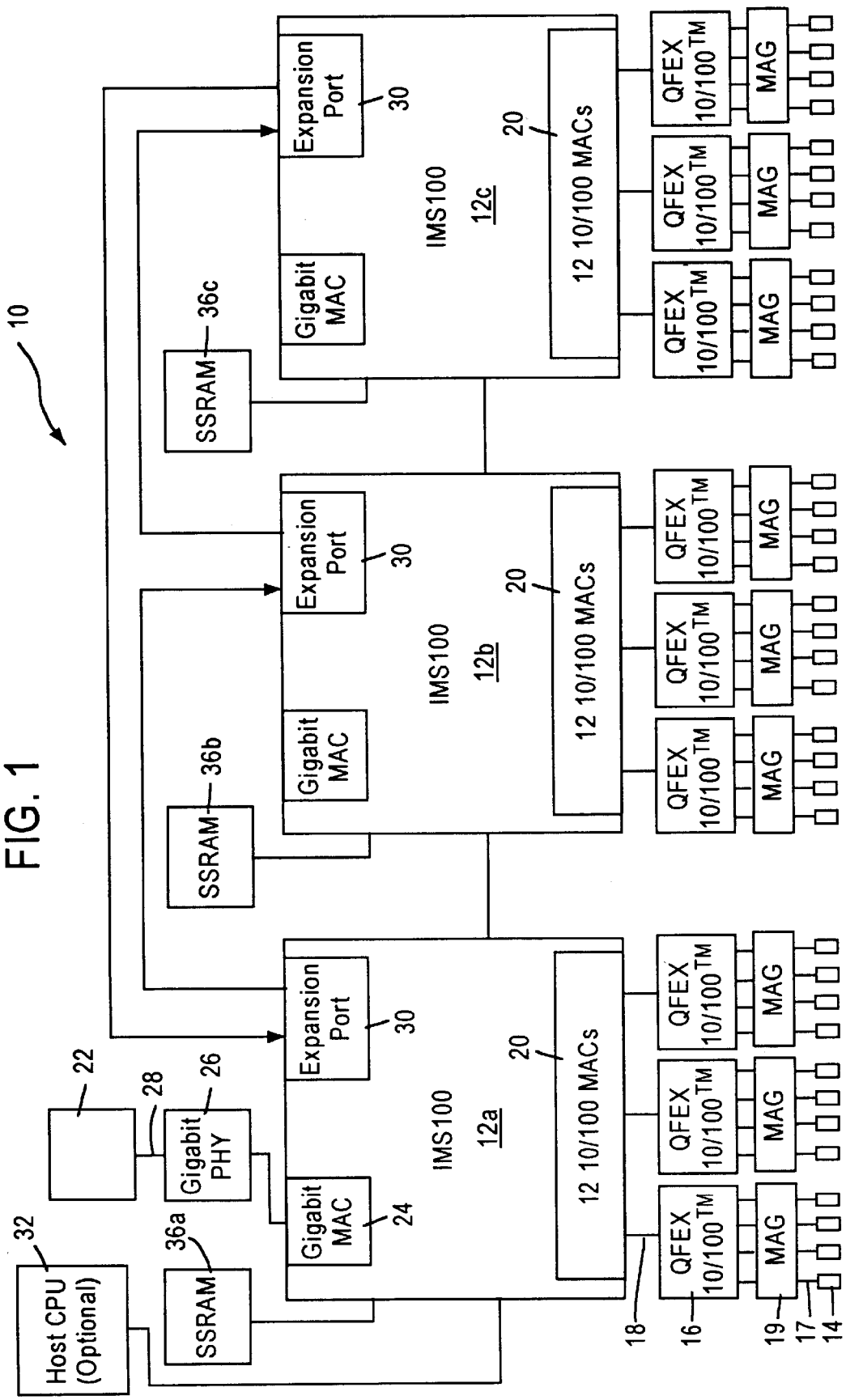
FIG. 1 is a block diagram of a packet switched network including a multiple port switch according to an embodiment of the present invention.

FIG. 1 is a block diagram of an exemplary system in which the present invention may be advantageously employed. The exemplary system 10 is a packet switched network, such as an Ethernet (IEEE 802.3) network. The packet switched network includes integrated multiport switches (IMS) 12 that enable communication of data packets between network stations. The network may include network stations having different configurations, for example twelve (12) 10 megabit per second (Mb/s) or 100 Mb/s network stations 14 (hereinafter 10/100 Mb/s) that send and receive data at a network data rate of 10 Mb/s or 100 Mb/s, and a 1000 Mb/s (i.e., 1 Gb/s) network node 22 that sends and receives data packets at a network speed of 1 Gb/s. The gigabit node 22 may be a server, or a gateway to a high-speed backbone network. Hence, the multiport switches 12 selectively forward data packets received from the network nodes 14 or 22 to the appropriate destination based upon Ethernet protocol.

Each multiport switch 12 includes a media access control (MAC) module 20 that transmits and receives data packets to and from 10/100 Mb/s physical layer (PHY) transceivers 16 via respective reduced media independent interfaces (RMII) 18 according to IEEE 802.3u protocol. Each multiport switch 12 also includes a gigabit MAC 24 for sending and receiving data packets to and from a gigabit PHY 26 for transmission to the gigabit node 22 via a high speed network medium 28.

Each 10/100 Mb/s network station 14 sends and receives data packets to and from the corresponding multiport switch 12 via a media 17 and according to either half-duplex or full duplex Ethernet protocol. The Ethernet protocol ISO/IEC 8802-3 (ANSI/IEEE Std. 802.3, 1993 Ed.) defines a half-duplex media access mechanism that permits all stations 14 to access the network channel with equality. Traffic in a half-duplex environment is not distinguished over the medium 17. Rather, each half-duplex station 14 includes an Ethernet interface card that uses carrier-sense multiple access with collision detection (CSMA/CD) to listen for traffic on the media. The absence of network traffic is detected by sensing deassertion of a receive carrier on the media. Any station 14 having data to send will attempt to access the channel by waiting a predetermined time, known as the interpacket gap interval (IPG), after deassertion of the receive carrier on the media. If a plurality of stations 14 have data to send on the network, each of the stations will attempt to transmit in response to the sensed deassertion of the receive carrier on the media and after the IPG interval, possibly resulting in a collision. Hence, the transmitting station will monitor the media to determine if there has been a collision due to another station sending data at the same time. If a collision is detected, both stations stop, wait a random amount of time, and retry transmission.

The 10/100 Mb/s network stations 14 that operate in full duplex mode send and receive data packets according to the Ethernet standard IEEE 802.3u. The full-duplex environment provides a two-way, point-to-point communication link enabling simultaneous transmission and reception of data packets between each link partner, i.e., the 10/100 Mb/s network station 14 and the corresponding multiport switch 12.

Each multiport switch 12 is coupled to 10/100 physical layer (PHY) transceivers 16 configured for sending and receiving data packets to and from the corresponding multiport switch 12 across a corresponding reduced media independent interface (RMII) 18. In particular, each 10/100 PHY transceiver 16 is configured for sending and receiving data packets between the multiport switch 12 and up to four (4) network stations 14 via the RMII 18. A magnetic transformer 19 provides AC coupling between the PHY transceiver 16 and the corresponding network medium 17. Hence, the RMII 18 operates at a data rate sufficient to enable simultaneous transmission and reception of data packets by each of the network stations 14 to the corresponding PHY transceiver 16.

Each multiport switch 12 also includes an expansion port 30 for transferring data between other switches according to a prescribed protocol. Each expansion port 30 enables multiple multiport switches 12 to be cascaded together as a separate backbone network.

Figure 2:
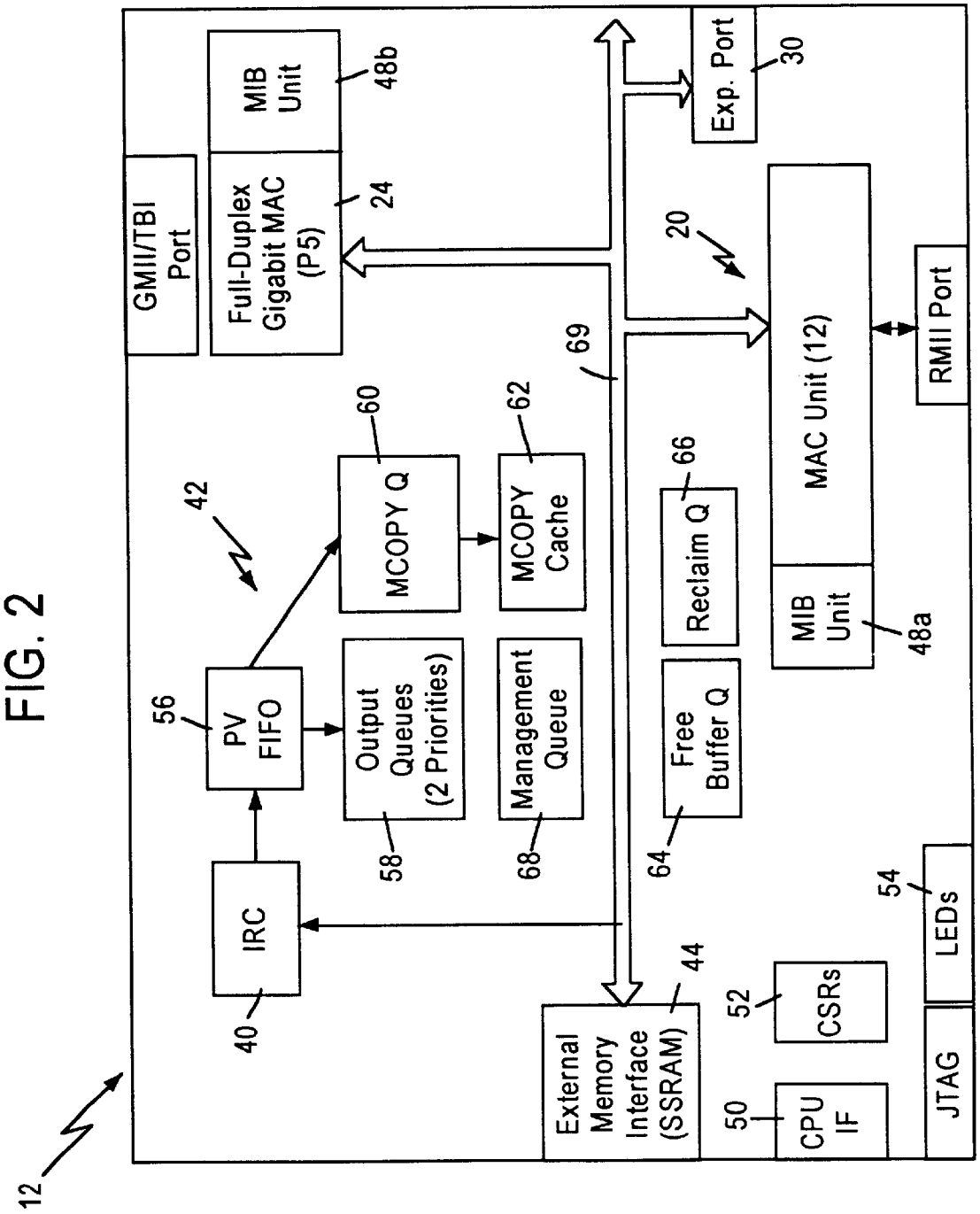
FIG. 2 is a block diagram of the multiple port switch of FIG. 1.

FIG. 2 is a block diagram of the multiport switch 12. The multiport switch 12 contains a decision making engine 40 that performs frame forwarding decisions, a switching subsystem 42 for transferring frame data according to the frame forwarding decisions, an external memory interface 44, management information base (MIB) counters 48a and 48b (collectively 48), and MAC (media access control) protocol interfaces 20 and 24 to support the routing of data packets between the Ethernet (IEEE 802.3) ports serving the network stations 14 and the gigabit node 22. The MIB counters 48 provide statistical network information in the form of management information base (MIB) objects, to an external management entity controlled by a host CPU 32, described below.

The external memory interface 44 enables external storage of packet data in an external memory 36 such as, for example, a synchronous static random access memory (SSRAM), in order to minimize the chip size of the multiport switch 12. In particular, the multiport switch 12 uses the external memory 36 for storage of received frame data and memory structures. The external memory 36 is preferably either a Joint Electron Device Engineering Council (JEDEC) pipelined burst or Zero Bus Turnaround™ (ZBT)-SSRAM having a 64-bit wide data path and a 17-bit wide address path. The external memory 36 is addressable as upper and lower banks of 128K in 64-bit words. The size of the external memory 36 is preferably at least 1 Mbytes, with data transfers possible on every clock cycle through pipelining. Additionally the external memory interface clock operates at clock frequencies of at least 66 MHz, and, preferably, 100 MHz and above.

The multiport switch 12 also includes a processing interface 50 that enables an external management entity such as a host CPU 32 to control overall operations of the multiport switch 12. In particular, the processing interface 50 decodes CPU accesses within a prescribed register access space, and reads and writes configuration and status values to and from configuration and status registers 52.

The internal decision making engine 40, referred to as an internal rules checker (IRC), makes frame forwarding decisions for data packets received.

The multiport switch 12 also includes an LED interface 54 that clocks out the status of conditions per port and drives an external LED logic. The external LED logic drives LED display elements that are human readable.

The switching subsystem 42, configured for implementing the frame forwarding decisions of the IRC 40, includes a port vector first in first out (FIFO) buffer 56, a plurality of output queues 58, a multicopy queue 60, a multicopy cache 62, a free buffer queue 64, and a reclaim queue 66.

The MAC unit 20 includes modules for each port, each module including a MAC receive portion, a receive FIFO buffer, a transmit FIFO buffer, and a MAC transmit portion. Data packets from a network station 14 are received by the corresponding MAC port and stored in the corresponding receive FIFO. The MAC unit 20 obtains a free buffer location (i.e., a frame pointer) from the free buffer queue 64, and outputs the received data packet from the corresponding receive FIFO to the external memory interface 44 for storage in the external memory 36 at the location specified by the frame pointer.

The IRC 40 monitors (i.e., "snoops") the data bus to determine the frame pointer value and the header information of the received packet (including source, destination, and VLAN address information). The IRC 40 uses the header information to determine which MAC ports will output the data frame stored at the location specified by the frame pointer. The decision making engine (i.e., the IRC 40) may thus determine that a given data frame should be output by either a single port, multiple ports, all ports (i.e., broadcast) or no ports (i.e., discarded). For example, each data frame includes a header having source and destination address, where the decision making engine 40 may identify the appropriate output MAC port based upon the destination address. Alternatively, the destination address may correspond to a virtual address that the appropriate decision making engine identifies as corresponding to a plurality of network stations. In addition, the frame may include a VLAN tag header that identifies the frame as information destined to one or more members of a prescribed group of stations. The IRC 40 may also determine that the received data packet should be transferred to another multiport switch 12 via the expansion port 30. Hence, the internal rules checker 40 will decide whether a frame temporarily stored in the external memory 36 should be output to a single MAC port or multiple MAC ports.

The internal rules checker 40 outputs a forwarding decision to the switch subsystem 42 in the form of a forwarding descriptor. The forwarding descriptor includes a priority class identifying whether the frame is high priority or low priority, a port vector identifying each MAC port that should transmit the data frame, receive port number, an untagged set, VLAN information, vector identifying each MAC port that should include VLAN information during transmission, opcode, and frame pointer. The format of the forwarding descriptor will discussed further with respect to FIG. 7. The port vector identifies the MAC ports to receive the data frame for transmission (e.g., 10/100 MAC ports 1–12, Gigabit MAC port, and/or Expansion port). The port vector FIFO 56 decodes the forwarding descriptor including the port vector, and supplies the frame pointer to the appropriate output queues 58 that correspond to the output MAC ports to receive the data frame transmission. In other words, the port vector FIFO 56 supplies the frame pointer on a per-port basis. The output queues 58 give the frame pointer to a dequeuing block 76 (shown in FIG. 3) which fetches the data frame identified in the port vector from the external memory 36 via the external memory interface 44, and supply the retrieved data frame to the appropriate transmit FIFO of the identified ports. If a data frame is to be supplied to a management agent, the frame pointer is also supplied to a management queue 68, which can be processed by the host CPU 32 via the CPU interface 50.

The multicopy queue 60 and the multicopy cache 62 keep track of the number of copies of the data frame that are transmitted from the respective ports, ensuring that the data frame is not overwritten in the external memory 36 until the appropriate number of copies of the data frame have been output from the external memory 36. Once the number of copies output corresponds to the number of ports specified in the port vector FIFO 56, the frame pointer is forwarded to the reclaim queue 66. The reclaim queue 66 stores frame pointers that need to be reclaimed and walks the linked list chain to return the buffers to the free buffer queue 64 as free pointers. After being returned to the free buffer queue 64, the frame pointer is available for reuse by the MAC unit 20 or the gigabit MAC unit 24.

Figures 3, 3A:
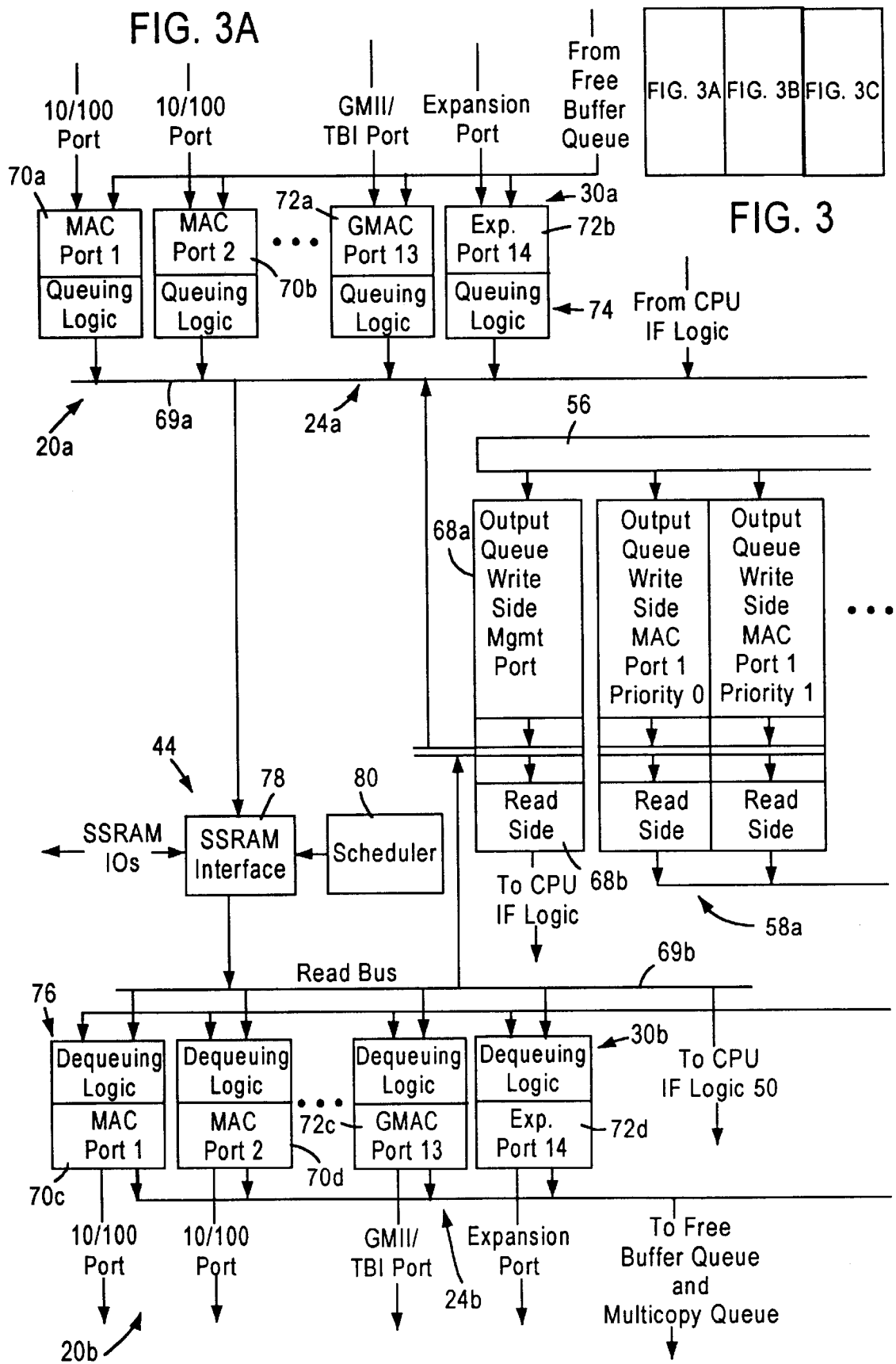
FIG. 3 is a block diagram illustrating in detail the switching subsystem of FIG. 2.
Figure 3B:
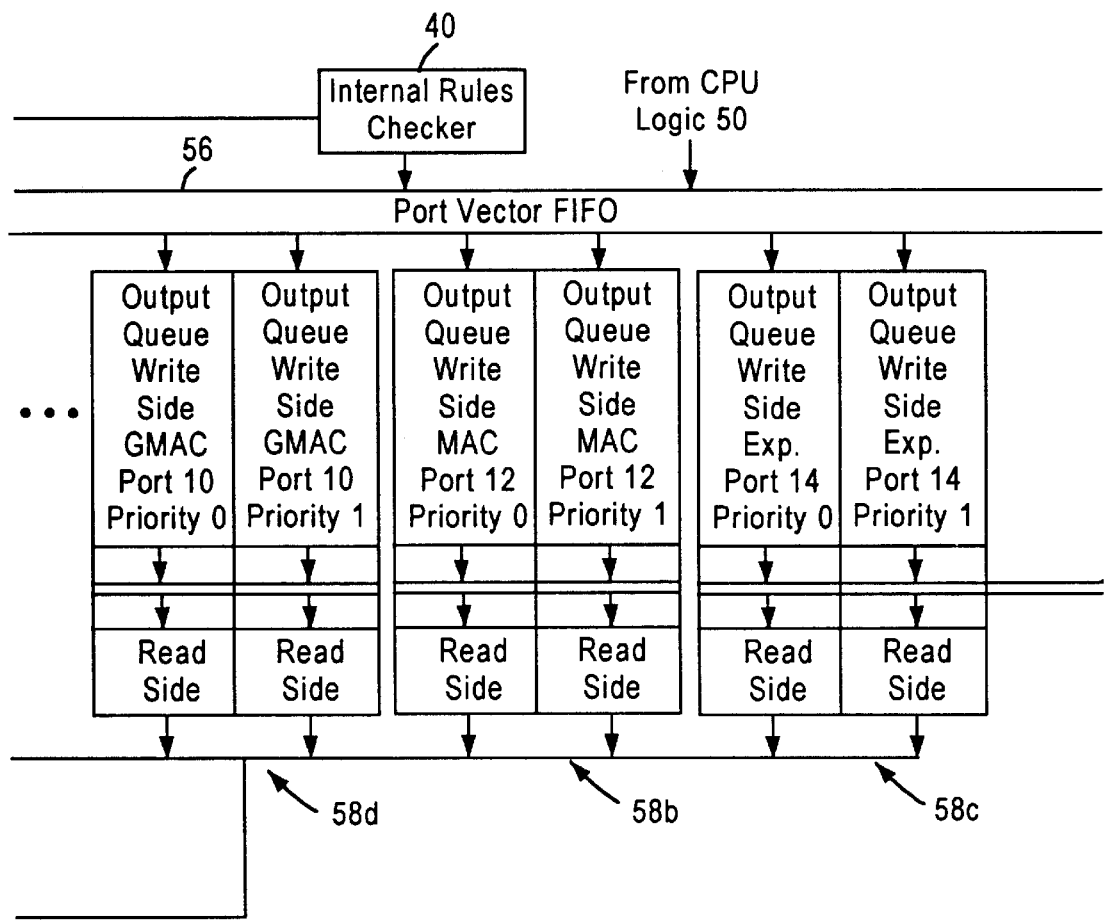
Figure 3C:
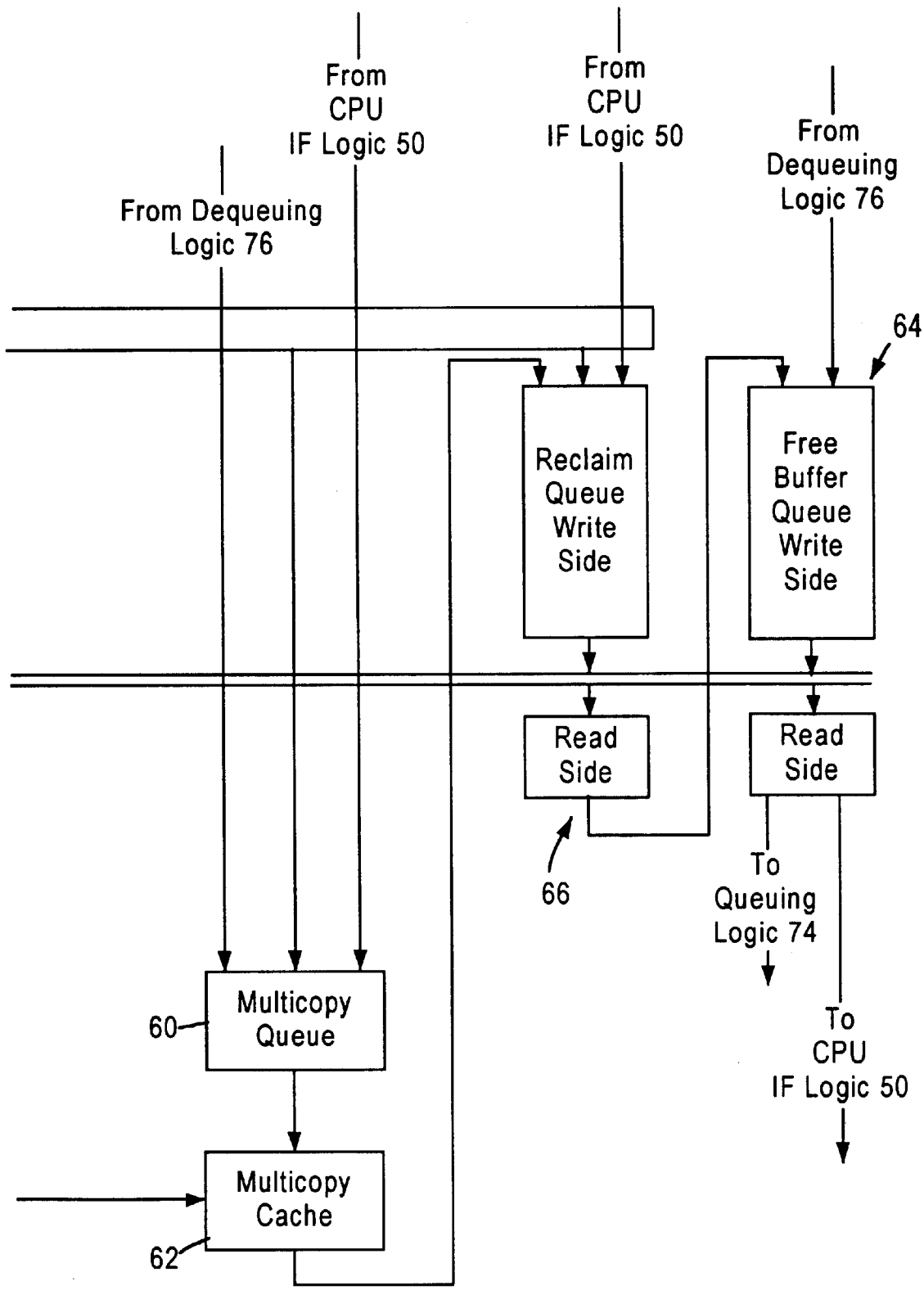

FIG. 3 depicts the switch subsystem 42 of FIG. 2 in more detail according to an exemplary embodiment of the present invention. Other elements of the multiport switch 12 of FIG. 2 are reproduced in FIG. 3 to illustrate the connections of the switch subsystem 42 to these other elements.

As shown in FIG. 3, the MAC module 20 includes a receive portion 20a and a transmit portion 24b. The receive portion 20a and the transmit portion 24b each include 12 MAC modules (only two of each shown and referenced by numerals 70a, 70b, 70c, and 70d) configured for performing the corresponding receive or transmit function according to IEEE 802.3 protocol. The MAC modules 70c and 70d perform the transmit MAC operations for the 10/100 Mb/s switch ports complementary to modules 70a and 70b, respectively.

The gigabit MAC port 24 also includes a receive portion 24a and a transmit portion 24b, while the expansion port 30 similarly includes a receive portion 30a and a transmit portion 30b. The gigabit MAC port 24 and the expansion port 30 also have receive MAC modules 72a and 72b optimized for the respective ports. The transmit portions 24b and 30b of the gigabit MAC port 24 and the expansion port 30a also have transmit MAC modules 72c and 72d, respectively. The MAC modules are configured for full-duplex operation on the corresponding port, and the gigabit MAC modules 72a and 72c are configured in accordance with the Gigabit Proposed Standard IEEE Draft P802.3z.

Each of the receive MAC modules 70a, 70b, 72a, and 72b include queuing logic 74 for transfer of received data from the corresponding internal receive FIFO to the external memory 36 and the rules checker 40. Each of the transmit MAC modules 70c, 70d, 72c, and 72d includes a dequeuing logic 76 for transferring data from the external memory 36 to the corresponding internal transmit FIFO, and a queuing logic 74 for fetching frame pointers from the free buffer queue 64. The queuing logic 74 uses the fetched frame pointers to store receive data to the external memory 36 via the external memory interface controller 44. The frame buffer pointer specifies the location in the external memory 36 where the received data frame will be stored by the receive FIFO.

The external memory interface 44 includes a scheduler 80 for controlling memory access by the queuing logic 74 or dequeuing logic 76 of any switch port to the external memory 36, and an SSRAM interface 78 for performing the read and write operations with the external memory 36. In particular, the multiport switch 12 is configured to operate as a non-blocking switch, where network data is received and output from the switch ports at the respective wire rates of 10, 100, or 1000 Mb/s. Hence, the scheduler 80 controls the access by different ports to optimize usage of the bandwidth of the external memory 36.

Each receive MAC stores a portion of a frame in an internal FIFO upon reception from the corresponding switch port; the size of the FIFO is sufficient to store the frame data that arrives between scheduler time slots. The corresponding queuing logic 74 obtains a frame pointer and sends a write request to the external memory interface 44. The scheduler 80 schedules the write request with other write requests from the queuing logic 74 or any read requests from the dequeuing logic 76, and generates a grant for the requesting queuing logic 74 (or the dequeuing logic 76) to initiate a transfer at the scheduled event (i.e., slot). Sixty-four bits of frame data is then transferred over a write data bus 69a from the receive FIFO to the external memory 36 in a direct memory access (DMA) transaction during the assigned slot. The frame data is stored in the location pointed to by the buffer pointer obtained from the free buffer pool 64, although a number of other buffers may be used to store data frames, as will be described.

The rules checker 40 also receives the frame pointer and the header information (including source address, destination address, VLAN tag information, etc.) by monitoring (i.e., snooping) the DMA write transfer on the write data bus 69a. The rules checker 40 uses the header information to make the forwarding decision and generate a forwarding instruction in the form of a forwarding descriptor that includes a port vector. The port vector has a bit set for each output port to which the frame should be forwarded. If the received frame is a unicopy frame, only one bit is set in the port vector generated by the rules checker 40. The single bit that is set in the port vector corresponds to a particular one of the ports.

The rules checker 40 outputs the forwarding descriptor including the port vector and the frame pointer into the port vector FIFO 56. The port vector is examined by the port vector FIFO 56 to determine which particular output queue should receive the associated frame pointer. The port vector FIFO 56 places the frame pointer into the top of the appropriate queue 58 and/or 68. This queues the transmission of the frame.

As shown in FIG. 3, each of the transmit MAC units 70c, 70d, 72d, and 72c has an associated output queue 58a, 58b, 58c, and 58d, respectively. In preferred embodiments, each of the output queues 58 has a high priority queue for high priority frames, and a low priority queue for low priority frames. The high priority frames are used for frames that require a guaranteed access latency, e.g., frames for multimedia applications or management MAC frames. The frame pointers stored in the FIFO-type output queues 58 are processed by the dequeuing logic 76 for the respective transmit MAC units. At some point in time, the frame pointer reaches the bottom of an output queue 58, for example, output queue 58d for the gigabit transmit MAC 70c. The dequeuing logic 76 for the transmit gigabit port 24b takes the frame pointer from the corresponding gigabit port output queue 58d, and issues a request to the scheduler 80 to read the frame data from the external memory 36 at the memory location specified by the frame pointer. The scheduler 80 schedules the request, and issues a grant for the dequeuing logic 76 of the transmit gigabit port 24b to initiate a DMA read. In response to the grant, the dequeuing logic 76 reads the frame data (along the read bus 69b) in a DMA transaction from the location in external memory 36 pointed to by the frame pointer, and stores the frame data in the internal transmit FIFO for transmission by the transmit gigabit MAC 72c. If the forwarding descriptor specifies a unicopy transmission, the frame pointer is returned to the free buffer queue 64 following writing the entire frame data into the transmit FIFO.

A multicopy transmission is similar to the unicopy transmission, except that the port vector has multiple bits set, designating the multiple ports from which the data frame will be transmitted. The frame pointer is placed into each of the appropriate output queues 58 and transmitted by the appropriate transmit MAC units 20b, 24b, and/or 30b.

The free buffer pool 64, the multicopy queue 60, the reclaim queue 66, and the multicopy cache 62 are used to manage use of frame pointers and re-use of frame pointers once the data frame has been transmitted to its designated output port(s). In particular, the dequeuing logic 76 passes frame pointers for unicopy frames to the free buffer queue 64 after the buffer contents have been copied to the appropriate transmit FIFO.

For multicopy frames, the port vector FIFO 56 supplies multiple copies of the same frame pointer to more than one output queue 58, each frame pointer having a unicopy bit set to zero. The port vector FIFO 56 also copies the frame pointer and the copy count to the multicopy queue 60. The multicopy queue 60 writes the copy count to the multicopy cache 62. The multicopy cache 62 is a random access memory having a single copy count for each buffer in external memory 36 (i.e., each frame pointer).

Once the dequeuing logic 76 retrieves the frame data for a particular output port based on a fetched frame pointer and stores the frame data in the transmit FIFO, the dequeuing logic 76 checks if the unicopy bit is set to 1. If the unicopy bit is set to 1, the frame pointer is returned to the free buffer queue 64. If the unicopy bit is set to zero indicating a multicopy frame pointer, the dequeuing logic 76 writes the frame pointer with a copy count of minus one (−1) to the multicopy queue 60. The multicopy queue 60 adds the copy count to the entry stored in the multicopy cache 62.

When the copy count in multicopy cache 62 for the frame pointer reaches zero, the frame pointer is passed to the reclaim queue 66. Since a plurality of frame pointers may be used to store a single data frame in multiple buffer memory locations, the frame pointers are referenced to each other to form a linked-list (i.e., chain) of frame pointers to identify the stored data frame in its entirety. The reclaim queue 66 traverses the chain of buffer locations identified by the frame pointers, and passes the frame pointers to the free buffer queue 64.

As discussed above, the internal rules checker (IRC) 40 monitors the write bus to capture frame header information (including source, destination, and VLAN address information) and frame pointers associated with received frames. The IRC 40 uses the associated header information to determine which MAC ports will output the data frame stored at the location specified by the frame pointer.

Figure 4:
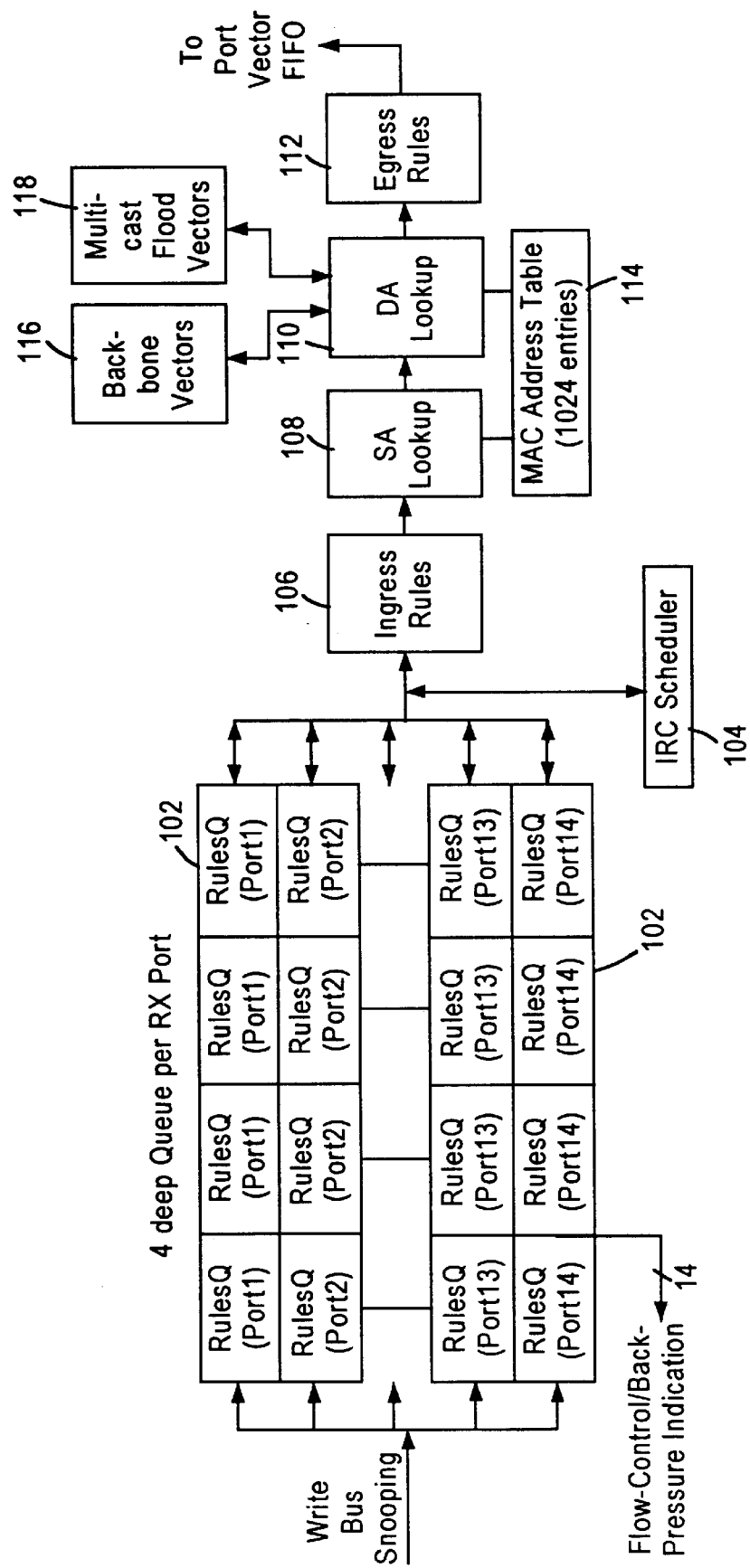
FIG. 4 is a block diagram of an internal rules checker (IRC) of the present invention.

As shown in FIG. 4, the IRC 40 may contain multiple rules queues 102 arranged for holding frame pointers and frame header information. A single rules queue 102 is assigned to each receive port of the IMS 12 for storing information associated with the frames received via the corresponding port. In particular, rules queues 1 to 12 may be provided for 10/100 MAC ports 1 to 12 configured to receive data from the corresponding 10/100 Mb/s network stations 14, a rules queue 13 may be arranged to support the gigabit MAC port 24 capable of receiving data from the gigabit network node 22, and a rules queue 14 may be assigned to the expansion port 30. In each rules queue 102, frame headers may be stored in a static random access memory (SRAM) having four 40-byte entries, and frame pointers may be stored in a SRAM having four 13-bit entries.

Frame headers and frame pointers from the rules queues 102 are transferred to IRC logic circuits such as ingress rules logic 106, source address (SA) lookup logic 108, destination address (DA) lookup logic 110 and egress rules logic 112 to produce a forwarding descriptor supplied to the port vector FIFO 56. The IRC scheduler 104 provides time slots for sequentially transferring data held in the rules queues 102 to the IRC logic circuitry.

The SA lookup logic circuit 108 and the DA lookup logic circuit 110 are connected to IRC address table logic 114 that contains an SRAM for storing the IRC address table. Prior to searching the address table, the ingress logic circuit 106 applies ingress rules to the received frame header. After the SA and DA lookup logic circuits 108 and 110 has searched the address table for SA and DA information, the egress rules logic circuit 112 applies egress rules to the port vector retrieved from the address table.

The IRC logic circuits 106, 108, 110 and 112 are connected in a pipeline that processes the frame header information of every received frame to produce a forwarding descriptor supplied to the port vector FIFO 56. In particular, the ingress rules logic circuit 106 detects whether a frame was received with an error. Also, the ingress rules logic circuit may check VLAN information of a frame to prevent the IMS 12 from forwarding a frame that does not belong to a VLAN associated with the port receiving that frame. If an error is detected or the frame's VLAN information does not match with allocated VLAN data, the ingress rules logic 106 produces a forwarding descriptor with a null port vector. This forwarding descriptor is transferred directly to the port vector FIFO 56 without performing SA and DA lookup operations and egress rules operations.

The SA lookup logic circuit 108 searches the IRC address table 114 for entries associated with the MAC source addresses for the corresponding frame. For instance, the SA lookup logic circuit 108 checks whether the SA and VLAN information stored in the IRC address table 114 for a given receive port matches the SA and VLAN information obtained from the received frame. If an unknown source address is obtained from a frame received by a particular switch port, the SA lookup logic circuit 108 may learn such address and add a new address entry to the IRC address table 114.

The DA lookup logic circuit 110 searches the DA and VLAN information in the IRC address table 114 to make a frame forwarding decision. In particular, the DA lookup logic circuit 110 checks whether the DA and VLAN information stored in the IRC address table 114 matches the DA and VLAN information obtained from the received frame.

The egress rules logic circuit 112 performs egress rules operations to check each transmit port in the port vector list produced by the DA lookup logic circuit 110 to remove or mask disabled ports, and the port from which the frame is received. Also, the egress rules logic circuit 112 may check the frame's VLAN information to prevent transmission from a port that does not support the VLAN associated with the frame. As a result, the egress rules logic circuit 112 generates a forwarding descriptor including port vectors identifying each port that should transmit the corresponding frame.

Figure 5:
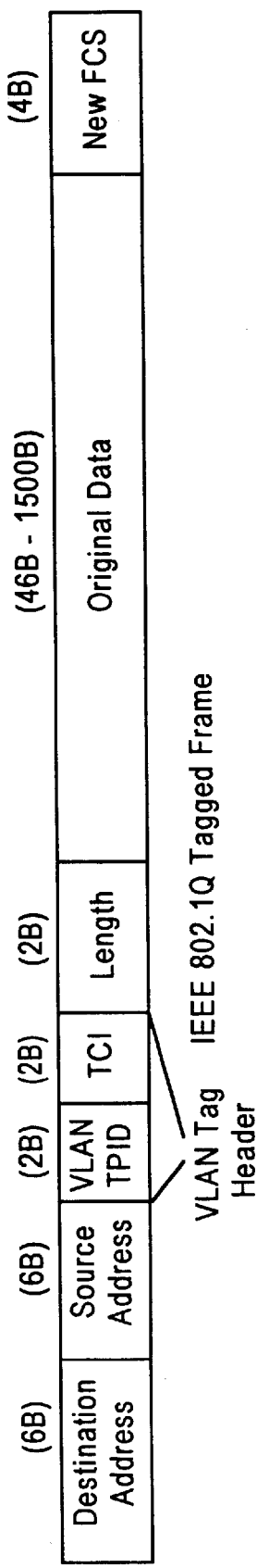
FIG. 5 is diagram illustrating format of an IEEE 802.1Q tagged frame.
Figure 6:
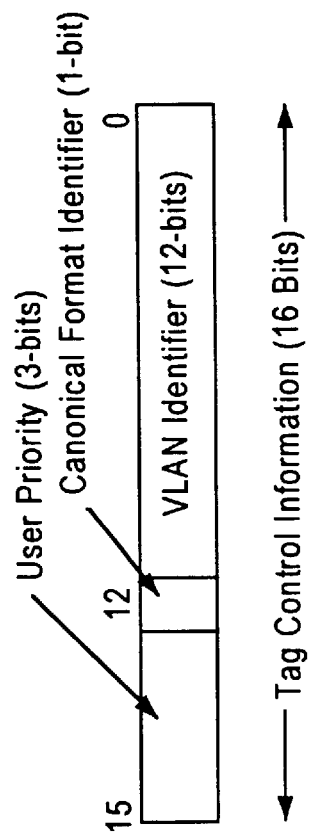
FIG. 6 is a diagram illustrating tag control information in the frame.

To communicate VLAN membership information to a network switch, a VLAN tag header may be inserted into a frame. As shown in FIG. 5, in accordance with the IEEE 802.1Q standard, a VLAN tag header is added to DA, SA, length, data and frame check sequence (FCS) fields. The VLAN tag header consists of a 16-bit VLAN tag protocol identifier (TPID) field, and a 16-bit tag control information (TCI) field. As shown in FIG. 6, the TCI field consists of a 3-bit user priority field, a 1-bit canonical format indicator (CFI), and a 12-bit VLAN identifier (VLAN ID).

The network switch 12 supports two modes for learning and forwarding received frames based upon their VLAN association: an IEEE 802.D mode and a backbone mode. The IEEE 802.D mode follows the traditional IEEE 802.1D bridging model to learn MAC addresses of a received frame and add its address information to the address table 114, if the SA lookup logic circuit 108 does not find its address information in the address table 114.

The backbone mode allows the switch 12 to operate in networks where the number of users exceeds the number of MAC addresses supported by the switch 12. In this mode, the switch 12 does not learn MAC source addresses for frames that come from a backbone port of the switch 12, i.e. from a port having a backbone connection to backbone network nodes. In particular, if the SA lookup logic circuit 108 does not find the SA and VLAN information of a received frame in the address table 114, the SA lookup logic circuit 108 determines whether the frame was received by a backbone port. If so, the SA lookup logic circuit 108 prevents the address information of the received frame from being added to the address table 114.

In the backbone mode, if the DA lookup logic circuit 110 does not find a match for the DA and VLAN information of a frame, it forwards the frame to a backbone port. For each of the VLANs supported by the switch 12, a separate backbone port may be provided. Any high-speed port of the switch 12, such as the gigabit port 24 or a trunk formed by several 10/100 MAC ports, may serve as a backbone port.

Figure 7:
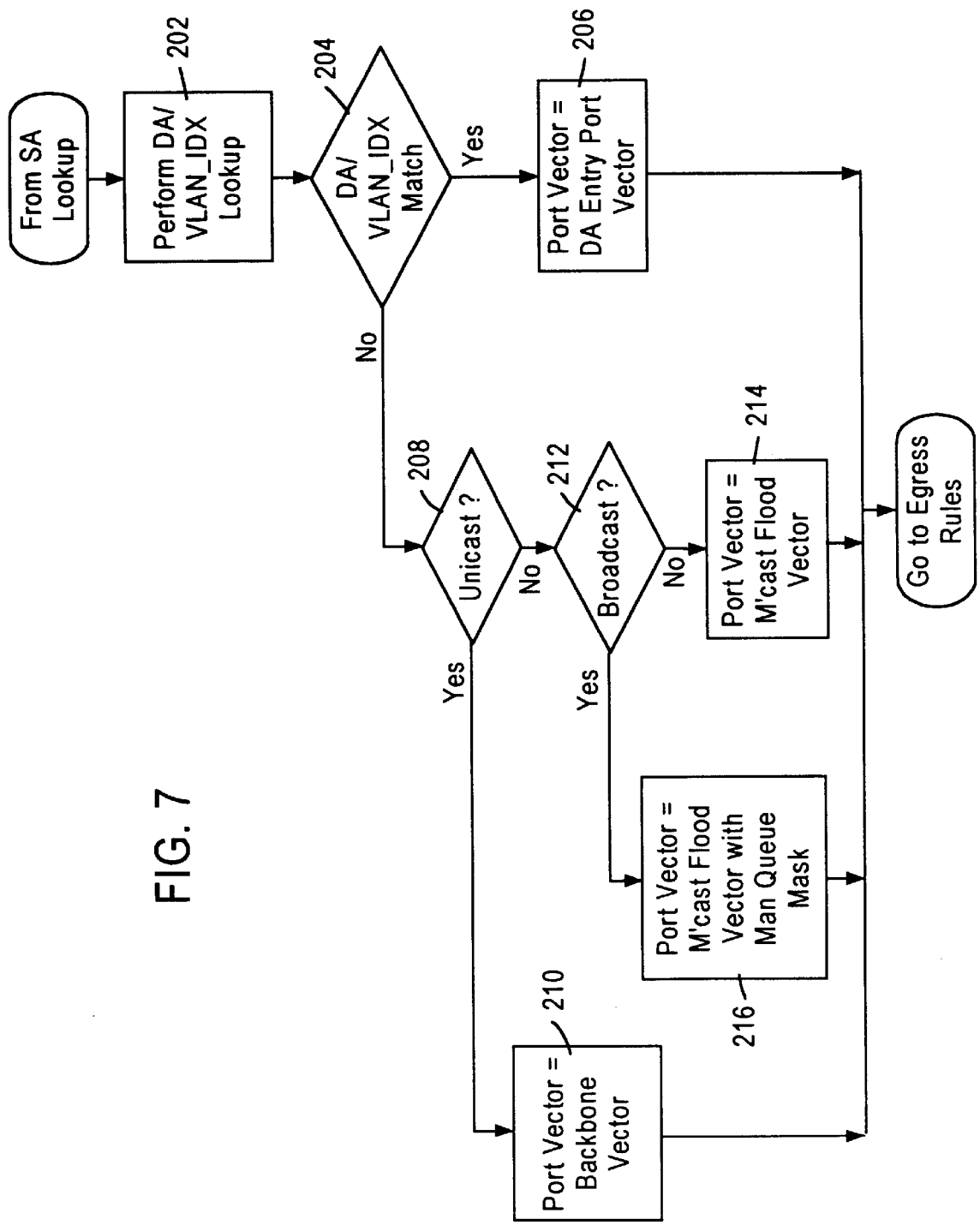
FIG. 7 is a flow chart illustrating a backbone forwarding procedure.

As shown in FIG. 7 illustrating a forwarding procedure in the backbone mode of operation, when SA lookup performed by the SA lookup logic circuit 108 is completed for a given frame, the frame's header is transferred to the DA lookup logic circuit 110 for DA and VLAN lookup (block 202). The DA lookup logic circuit 110 searches the address table 114 for an entry associated with the DA and VLAN information that matches frame DA and VLAN information carried by the frame's header (block 204). If the DA and VLAN information is found in the address table 114 (block 206), the port vector retrieved from the corresponding entry of the address table 114 is transferred to the egress logic circuit 112 for generating the forwarding descriptor.

However, if the DA and VLAN information of the frame does not match with any entry in the address table 114, the DA lookup logic circuit 110 determines whether or not the frame is a unicast frame (block 208). If the frame is a unicast frame, the DA lookup logic circuit 110 searches a backbone vector table 116 for a backbone vector associated with the VLAN, from which the frame is received (block 210).

The backbone vector table 116 may be stored in a backbone vector table SRAM provided in the IRC 40. The backbone vector table 116 may contain 64 entries. One entry may be assigned to each of the 64 VLANs supported by the switch 12. Each entry may comprise a 14-bit backbone vector identifying backbone ports for the corresponding VLAN. Each bit of the backbone vector may correspond to a particular port. For example, bits 1–12 may correspond to 10/100 MAC ports 20 (FIG. 1), bit 13 may correspond to the gigabit port 24, and bit 14 may correspond to the expansion port 30.

A backbone vector for each VLAN may be programmed by the host CPU to identify at least one backbone port for that VLAN. Several VLAN entries may contain identical backbone vectors, because each backbone port may be associated with multiple VLANs.

For example, the entries of the backbone vector table 116 may be arranged by VLAN indices uniquely identifying VLANs. The IRC 40 may have a translation table that enables the IRC 40 to translate a 12-bit VLAN ID of a frame into the corresponding VLAN index.

Thus, the DA lookup logic circuit 110 reads the backbone vector for the VLAN from which a given frame is received, and transfers this backbone vector to the egress rules logic circuit 112 for generating the forwarding descriptor identifying the backbone port for the frame's VLAN. Any unicast frame with unknown destination address will be forwarded for transmission via the backbone port for the frame's VLAN regardless of the receive port. As a result, the backbone forwarding procedure of the present invention allows the switch 12 to avoid learning addresses of backbone nodes and adding these addresses to the address table 114. Thus, the size of the address table SRAM may be reduced.

As discussed above, any port or trunk of the switch 12 may be used as the backbone port. Multiple backbone ports are allowed on the same switch chip. Each backbone port may be associated with its own set of VLANs in accordance with the backbone vector table 116. A frame will be forwarded to a backbone port only if the frame belongs to the VLAN associated with that backbone port.

If a switch is composed of several switch chips 12a, 12b and 12c (FIG. 1) with separate address tables 114, the expansion ports 30 of the switch chips may be designated as backbone ports to prevent each switch chip from learning addresses of backbone nodes associated with the other switch chips. Frames with unknown destination addresses will be forwarded to the expansion ports in addition to the corresponding backbone ports. In this case, a backbone flag may be inserted into the header of a frame forwarded to the expansion port to indicate whether the frame is received from a backbone node or from a desktop node. As a result, a frame from a desktop node on a first chip addressed to a desktop node on a second chip will not be sent to the backbone port of the first chip.

Referring back to FIG. 7, if the DA lookup logic circuit 110 determines that the received frame is not a unicast frame, it checks whether the frame is a broadcast frame (block 212). If not, the frame is considered to be a multicast frame. In this case, the DA lookup logic circuit 110 searches a multicast flood vector table 118 for a multicast flood vector associated with a VLAN, from which the frame is received (block 214).

The multicast flood vector table 118 may be stored in a multicast flood vector table SRAM provided in the IRC 40. The multicast flood vector table 118 may contain 64 entries. One entry may be assigned to each of the 64 VLANs supported by the switch 12. Each entry may comprise a multicast flood vector identifying multicast ports for the corresponding VLAN. For example, the entries of the multicast flood vector table 118 may be arranged by VLAN indices uniquely identifying VLANs. Multicast flood vectors may be programmed by the host CPU to identify ports which should transmit multicast frames.

The multicast flood vectors read from the multicast flood vector table 118 are transferred to the egress rules logic circuit 112 for generating the forwarding descriptor identifying ports for transmitting the multicast frame.

If the received frame is a broadcast frame, the DA lookup logic circuit 110 also searches the multicast flood vector table 118 for multicast flood vectors associated with the frame's VLAN (block 216). In addition to the multicast flood vector, each entry of the multicast flood vector table 118 contains a mask bit for disabling the transfer of a broadcast frame to the management queue. If the received frame is a broadcast frame, the DA lookup logic circuit 110 reads the multicast flood vector table together with the mask bit for the frame's VLAN and transfers this information to the egress rules logic circuit 112. As a result, the forwarding descriptor generated by the egress rules logic circuit 112 identifies every port that should transmit the broadcast frame including the port from which the frame is received.

In this disclosure, there are shown and described only the preferred embodiments of the invention, but it is to be understood that the invention is capable of changes and modifications within the scope of the inventive concept as expressed herein.

What is claimed is:

1. A network switching system comprising multiple ports including at least one backbone port for providing data communications with backbone network nodes, and a decision making engine responsive to a received data packet to control forwarding the received data packet to a transmit port, the decision making engine including a destination address logic circuit for comparing destination information of the received data packet with a predetermined set of address data, the decision making engine being configured for forwarding the received data packet to the at least one backbone port if the destination information of the received data packet is not found in the predetermined set of address data, wherein the decision making engine further comprises a source address logic circuit for comparing source address information of the received data packet with the predetermined set of address data, the source address logic circuit is operable in a regular mode to add address information of the received data packet to the predetermined set of address data if the source address information of the received data packet is not found in the predetermined set of address data, and the source address logic circuit is further operable in a backbone mode to prevent the address information of a data packet received from the at least one backbone port from being added to the predetermined set of address data.

2. A network switching system comprising multiple ports including at least one backbone port for providing data communications with backbone network nodes, and a decision making engine responsive to a received data packet to control forwarding the received data packet to a transmit port, the decision making engine including a destination address logic circuit for comparing destination information of the received data packet with a predetermined set of address data, the decision making engine being configured for forwarding the received data packet to the at least one backbone port if the destination information of the received data packet is not found in the predetermined set of address data, wherein the multiple ports include backbone ports for multiple VLANs supported by the system.

3. The system of claim 2, wherein the decision making engine is configured for forwarding a first data packet received from a first VLAN to at least one first backbone port for the first VLAN if the destination information of the first received data packet is not found in the predetermined set of address data.

4. The system of claim 3, wherein the decision making engine is configured for forwarding a second data packet received from a second VLAN to at least one second backbone port for the second VLAN if the destination information of the second received data packet is not found in the predetermined set of address data.

5. The system of claim 2, wherein the decision making engine further comprises a backbone storage for identifying the backbone ports for the multiple VLANs.

6. The system of claim 5, wherein the backbone storage comprises a backbone vector for each of the multiple VLANs.

7. The system of claim 6, wherein each data element of the backbone vector identifies a backbone port.

8. In a network switch having a plurality of ports including at least one backbone port for providing data communications with backbone network nodes, a method of data forwarding comprising the steps of:

comparing destination information of a received data packet with a predetermined set of address data, and forwarding the received data packet to the at least one backbone port if the destination information of the received data packet is not found in the predetermined set of address data;

the method further comprising comparing source address information of the received data packet with the predetermined set of address data, wherein in a regular mode of operation, address information of the received data packet is added to the predetermined set of address data if the source address information of the received data packet is not found in the predetermined set of address data, and in a backbone mode of operation, the address information of a data packet received from the at least one backbone port is prevented from being added to the predetermined set of address data.

9. In a network switch having a plurality of ports including at least one backbone port for providing data communications with backbone network nodes, a method of data forwarding comprising the steps of:

comparing destination information of a received data packet with a predetermined set of address data, and forwarding the received data packet to the at least one backbone port if the destination information of the received data packet is not found in the predetermined set of address data, wherein a first data packet received from a first VLAN is forwarded to at least one first backbone port for the first VLAN if the destination information of the first received data packet is not found in the predetermined set of address data, and a second data packet received from a second VLAN is forwarded to at least one second backbone port for the second VLAN if the destination information of the second received data packet is not found in the predetermined set of address data.

* * * * *